US008392158B2

(12) United States Patent
James

(10) Patent No.: US 8,392,158 B2
(45) Date of Patent: Mar. 5, 2013

(54) METHODS FOR COMPLETING THERMAL-RECOVERY WELLS

(75) Inventor: Simon G. James, Le Plessis-Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 358 days.

(21) Appl. No.: 12/839,598

(22) Filed: Jul. 20, 2010

(65) Prior Publication Data

US 2012/0018154 A1 Jan. 26, 2012

(51) Int. Cl.
*G06F 17/50* (2006.01)
(52) U.S. Cl. .. 703/2; 703/5; 703/13; 702/6; 166/250.01; 166/278
(58) Field of Classification Search .................. 703/2, 5, 703/13; 166/250, 278, 250.01; 702/6
See application file for complete search history.

(56) References Cited

U.S. PATENT DOCUMENTS

| | | | | |
|---|---|---|---|---|
| 5,935,317 | A * | 8/1999 | Soroushian et al. | 106/723 |
| 6,296,057 | B2 | 10/2001 | Schlumberger | |
| 6,922,637 | B2 * | 7/2005 | Ravi et al. | 702/6 |
| 7,422,060 | B2 * | 9/2008 | Hammami et al. | 166/281 |
| 7,490,668 | B2 | 2/2009 | Halliburton | |
| 8,226,762 | B2 * | 7/2012 | Le Rolland et al. | 106/695 |
| 2005/0241829 | A1 * | 11/2005 | Ravi et al. | 166/293 |
| 2006/0266107 | A1 * | 11/2006 | Sweatman et al. | 73/152.01 |
| 2007/0017675 | A1 * | 1/2007 | Hammami et al. | 166/278 |
| 2010/0212892 | A1 * | 8/2010 | Santra et al. | 166/250.14 |

OTHER PUBLICATIONS

Baumgarte C et al.: "Case Studies of Expanding Cement to Prevent Microannular Formation," paper SPE 56535 (1999).
Bour, D: "Cyclic Steam Well Design: A New Approach to Solve an Old Problem of Cement Sheath Failure in Cyclic Steam Wells," paper SPE 93868 (2005).
Carter LG et al.: "Expanding Cements for Primary Cementing," Journal of Petroleum Technology (May 6, 1966) 22, No. 5, 551-558.
Farouq Ali SM and Meldau RF: "Current Steamflood Technology," Journal of Petroleum Technology (Oct. 1979) 13, 1332-1342.
Greer FC and Shryock SH: "New Technique Improves Steam Stimulation Completions," paper SPE 1944 presented at the Annual California Regional Fall Meeting, Los Angeles, California, USA (Oct. 26-27, 1967).
Humphrey HC: "Casing Failures Caused by Thermal Expansion," World Oil (Nov. 1960) 151, No. 6, 105-108.
Saidin S et al.: "A New Approach for Optimizing Cement Design to Eliminate Microannulus in Steam Injection Wells," paper IPTC 12407 presented at the International Petroleum Technology Conference, Kuala Lumpur, Malaysia (Dec. 3-5, 2008).
Smith FM: "Thermal Expansion of Cemented Casing," Proceedings of the 25th Pennsylvania State University Petroleum Production Conference, State College, Pennsylvania, USA, (Oct. 19-21, 1966) 249-273.
Thiercelin MJ et al.: "Cement Design Based on Cement Mechanical Response," paper SPE 38598 (1997).

*Primary Examiner* — Thai Phan
(74) *Attorney, Agent, or Firm* — Matthias Abrell

(57) ABSTRACT

Methods for completing a well involve the use of computational models to design cement systems that are appropriate for the anticipated well conditions. Data from laboratory tests and/or numerical simulations may be employed in the models. The cement systems are designed to have a higher Young's modulus than the surrounding formation. In addition, the cement systems contain chemical-expansion agents that cause a microannulus to be deliberately formed at the cement/casing interface prior to the application of heat. The microannulus disappears during application of heat, pressure or both owing to casing expansion.

20 Claims, 4 Drawing Sheets

METHODS FOR COMPLETING THERMAL-RECOVERY WELLS

BACKGROUND OF THE INVENTION

The statements in this section merely provide background information related to the present disclosure and may not constitute prior art.

This invention relates to equipment and methods for completing subterranean wells; in particular, wells that are subjected to steam- or water-injection treatments.

During completion of a subterranean well, drilling and cementing operations are performed to provide a conduit through which desirable fluids originating within the formation may flow. The cementing operation involves placing a competent cement sheath inside the annular region between the external surface of a tubular body such as well casing, and the borehole wall. The cement sheath supports the casing and provides a hydraulic seal between producing formations. The presence of a hydraulic seal is commonly referred to as zonal isolation.

Well cementing is a difficult operation because it requires several parameters to be considered and controlled. For example, a slurry that is too dense may cause the formation rock to fracture, while a slurry that is too light may allow formation fluids to intrude. While slurry density is a parameter that is relatively easy to control, this is not true of the rheological properties. Such problems, which are inherent to any well-cementing operation, are well known to the skilled person, and solutions generally involve incorporating various additives into the slurry, the selection of which is not always clear and varies from one well to another. Detailed information about well cementing may be found in the following publication: Nelson E B and Guillot D (eds.): *Well Cementing, 2$^{nd}$ Edition*, Schlumberger (2006), incorporated in its entirety by reference thereto.

When well cementing is successful, and a cement sheath has been formed that provides casing support and zonal isolation once the slurry has set and hardened, it may not be long before the sheath is subjected to mechanical and/or thermal stresses that can lead to deterioration. Cement systems employed in thermal-recovery wells are particularly prone to problems that lead to loss of zonal isolation. One type of thermal-recovery well involves the injection of steam into the wellbore, commonly known as steamflooding. Steamflooding may consist of introducing steam into an injection well and sending the steam through the formation to one or more production wells. Another technique involves cyclic steam injection, during which steam is injected into a single well for a limited period. After the steam-injection period, the well is placed into production. Heating the reservoir reduces the viscosity of oil in the formation, making production more efficient. Steamflood wells are usually less than 915 m (3000 ft) deep, and are frequently deviated (30° to horizontal). The circulating temperatures during primary-cementing operations are often less than 40° C. (104° F.). During injection, the steam temperature may approach about 315° C. (600° F.).

When heat is initially supplied, the temperature rise is normally controlled to prevent undue thermal shock to the casing and cement. Nevertheless, because of thermal expansion, high levels of stress are built up in the pipe and the cement sheath.

A substantial amount of work has been performed for many years to devise cementing techniques that minimize the effects of thermal expansion. Such methods include the placement of thermal packers and the inclusion of a sliding sleeve in the casing string that can move freely in response to thermal stress. Another procedure involves holding the casing in tension during primary cementing to minimize expansion when thermal stress is eventually applied.

In some instances, methods involve applying internal casing pressure after the primary cementing has been performed, and while the cement slurry is setting and hardening. The internal pressure may vary from about 15.9 MPa to 138 MPa (2300 psi to 20,000 psi). This process prestresses the casing, and gives the cement sheath an improved ability to withstand the application of heat during the steam-injection process. Modeling software is used to analyze the anticipated well conditions during steam production, and determine the optimal amount of casing pressurization. All of the above techniques have aimed at maintaining the strongest possible bonding between the cement sheath and the casing.

Expanding cements have also been proposed in an effort to preserve intimate cement/casing and cement/formation bonding during all stages of the well's life. Unfortunately, when the formation is weak (a common occurrence in steamflood wells), expansion may cause the cement sheath to move away from the casing, creating a microannulus. For this reason, expanding cements for thermal recovery wells are generally not recommended. At the other extreme, cement expansion coupled with thermal expansion of casing and a stronger formation can compress the cement sheath, leading to cracking and even pulverization.

Despite the valuable contributions of the prior art, cement-sheath failures and loss of zonal isolation continue to occur. Therefore, there remains a continued need for improved cementing techniques in the realm of steam-injection wells.

SUMMARY OF THE INVENTION

Some embodiments include improved methods for cementing thermal-recovery wells and maintaining zonal isolation during production. The methods involve expanding cement systems; however, unlike previous approaches, a microannulus at the cement/casing interface is deliberately created before the application of heat in the well. The cement/formation interface remains intact. In addition, the set cement has a higher Young's modulus than the formation. When the well operator applies heat, pressure or both, the casing expands and seals the microannulus, thereby providing zonal isolation during the injection of fluids into the well. Modeling software is employed to analyze the well completion and the proposed well-production strategy. The software then determines the optimal cement-sheath expansion and mechanical properties. Ultimately, a cement system is designed that meets the requirements specified by the software, and the system is placed in the well.

Another aspect relates to methods for designing a cement system for a well.

Another aspect relates to a method for cementing a well.

In yet another aspect, embodiments relate to methods of completing a well.

DETAILED DESCRIPTION

Figure 1:
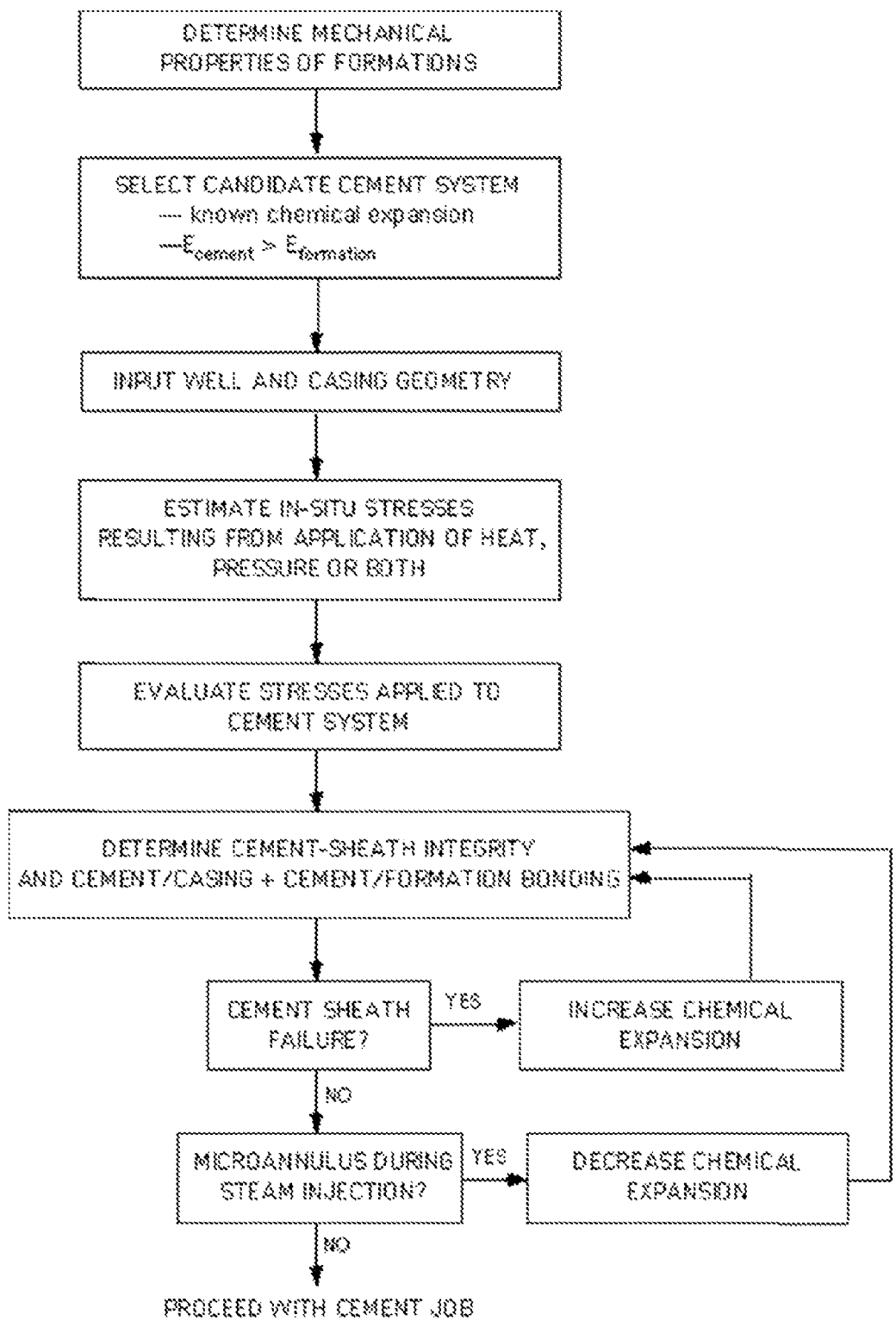
FIG. 1 is a flow chart illustrating the steps of the method for designing a cement system for a well.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

As discussed earlier, a need exists for improved cement-design, primary-cementing and completion methods for wells, particularly steam-injection wells.

In an aspect, some embodiments relate to a methods for designing a cement system for a well. The well has a borehole that penetrates subterranean formations, and has at least one tubular body and at least one cement sheath. It will be appreciated that the tubular body may be drillpipe, casing, coiled tubing or a combination thereof. Hereinafter, the general term "casing" will be used to denote all types of tubular bodies that serve as conduits between subterranean formations and the wellhead.

The method involves expanding cement systems; however, unlike previous approaches, a microannulus at the cement/casing interface is deliberately created before the application of heat, pressure or both in the well. The cement/formation interface remains intact. To achieve this, the set cement has a higher Young's modulus than the formation. When the well operator applies heat, pressure or both, the casing expands and seals the microannulus, thereby providing zonal isolation during the injection of fluids into the well.

Skilled persons in the art will recognize that expanding cements comprise chemical compounds that react or crystallize after the cement has set, forming compounds with a greater absolute volume. The absolute-volume increase causes a corresponding expansion of the cement sheath. Compounds that impart chemical expansion in cements may include magnesium oxide, calcium oxide, chloride salts, calcium sulfate hemihydrate, and combinations thereof.

A modeling application, such as CemSTRESS™ cement sheath stress analysis software, available from Schlumberger, can be employed to analyze the well completion and the proposed well-production strategy. The physics of the model is described in the following publication: Thiercelin M J et al.: "Cement Design Based on Cement Mechanical Response," paper SPE 38598 (1997). The software then determines the optimal mechanical properties and the necessary amount of cement-sheath expansion. Ultimately, a cement system is designed that meets the requirements specified by the software.

The design process is illustrated by the flow chart in FIG. 1. One determines the mechanical properties of the formations surrounding the wellbore. Knowledge of the Young's moduli is required; in some cases, it may be further helpful to also know the Poisson's ratios, and even to additionally know both the compressive strengths and tensile strengths.

Next, one selects a candidate cement system with a known amount of chemical expansion after setting, and a higher Young's modulus than the surrounding formation. Well-geometry and casing-geometry data are also acquired.

Then, a stress-analysis software is preferably employed to estimate the downhole pressure, temperature and in-situ stresses that result from the application of heat, pressure or both in the well. The software may also evaluate how the stresses resulting from the application of heat, pressure or both affect cement-sheath integrity, the cement/casing bond and the cement/formation bond.

If cement-sheath failure is indicated, which may be manifested in the form of radial or longitudinal cracking, or the presence of a microannulus during the application of heat, pressure or both, one modifies the candidate cement system to feature an additional amount of chemical expansion after setting. The software is again employed to determine the stresses' effects on the cement-sheath integrity and bonding. This iterative process is continued until the model predicts that the cement sheath will remain intact during the application of heat, pressure or both.

After a cement design has been determined that can withstand the stresses associated with the application of heat, pressure or both, attention is paid to the cement/casing and cement/formation bonds. If the model predicts the presence of a microannulus at either interface during the application of heat, pressure or both, the candidate system is modified to have a lower amount of expansion. The software then reevaluates the effects of applying heat, pressure or both. This iterative process is again continued until the model predicts that no microannuli will exist during the application of heat, pressure or both. Once success is achieved, the modified cement system is selected as the "final design" for application in the well.

In another aspect, embodiments relate to methods for cementing a well. The well has a borehole that penetrates subterranean formations, and has at least one tubular body and at least one cement sheath.

First, the design method described earlier is employed to develop a suitable cement system for a particular well, called the final design. Next, a casing string according to the one specified during modeling is installed inside the subterranean wellbore. Then, the cement system according to the final design is placed in at least one portion of the annular region between external surface of the casing string and the borehole wall.

Yet another aspect relates to a method for completing a well. The well has a borehole that penetrates subterranean formations, and has at least one tubular body and at least one cement sheath.

The design method described earlier is employed to develop a suitable cement system for a particular well—the final design. Next, a casing string according to the one specified during modeling is installed inside the subterranean wellbore. Then, the cement system according to the final design is placed in at least one portion of the annular region between external surface of the casing string and the borehole wall.

The cement system is allowed to set, harden and expand outwards, thereby creating a microannulus at the cement/ casing interface prior to the application of heat or pressure. Then, the casing is perforated, creating at least one conduit through which injected fluids may flow into the formation, and formation fluids may flow into the casing interior. Next, heat, pressure or both are applied in the well and, according to the final design, the casing expands outward and seals the microannulus at the casing/cement interface. Thus, zonal isolation is established during the injection process. Finally, formation fluids may flow through one or more perforation conduits into the casing interior, and continue toward the wellhead.

The well may be a steam-injection well or a production well in the vicinity of the steam-injection well, through which heated fluids are recovered. In some cases, the steam-injection well is also a production well. Such a process is known in the art as cyclic steam injection or "huff-and-puff."

Without wishing to be bound by any theory, it is believed that, for steam-injection wells, the presence of a microannulus at the cement/casing interface before and during the initial heat-up period is not critical. Relatively small volumes of steam are pumped during this period, and will be in a liquid state when it arrives at the formation of interest. The liquid water will be far less mobile than steam; thus, the presence of a microannulus is less important. During the production phase in cyclic-steam-injection wells, the casing temperature will decrease and the microannulus will reform. However, the hot oil produced during this stage will also have low mobility, and will not flow into the microannulus to a significant extent.

Although the methods described have been presented largely in the context of steam-injection wells, the methods are equally applicable to water-injection wells in which pressure is applied during the injection process. The internal casing pressure causes the casing to expand and seal the microannulus, thereby establishing zonal isolation during the water-injection process.

The completion method may further comprise performing a stimulation treatment to increase well-production efficiency. The stimulation treatment may be a matrix-acidizing treatment, a hydraulic-fracturing treatment, or both.

The cement may be based on Portland cement. In addition, data from laboratory tests may be used as inputs for at least one step of the design process. Likewise, data from numerical simulations may be used as inputs for at least one step of the design process.

EXAMPLES

The following examples serve to further illustrate some embodiments. Both examples employed the CemSTRESS™ cement sheath stress analysis software, described earlier. The base inputs to the simulator for both examples are shown in Table 1. Well-geometry, formation-properties and cement-properties data are given.

TABLE 1

Base inputs to CemSTRESS cement sheath stress analysis software.

| Well Geometry | |
|---|---|
| Hole diameter | 8.5 in. (21.5 mm) |
| Casing diameter | 7.0 in. (17.8 mm) |
| Casing weight | 26 lbm/ft (39 kg/m) |
| Casing material | steel |
| Standoff | 75% |

TABLE 1-continued

Base inputs to CemSTRESS cement sheath stress analysis software.

| Formation Properties | |
|---|---|
| Young's modulus | 1034 MPa |
| Poisson's ratio | 0.33 |
| Thermal conductivity | 2.1 (W/(m.K) |
| Heat capacity | 118 J/(kg.K) |
| Thermal expansion coefficient | $13 \times 10^{-6}$ $K^{-1}$ |
| Cement Properties | |
| Young's modulus | 8500 MPa |
| Poisson's ratio | 0.08 |
| Tensile strength | 4.8 MPa |
| Compressive strength | 48 MPa |
| Thermal conductivity | 1.2 (W/(m · K) |
| Heat capacity | 2100 J/(kg · K) |
| Thermal expansion coefficient | $10 \times 10^{-6}$ $K^{-1}$ |

Example 1

The simulation considered a temperature increase from the initial bottomhole static temperature (54° C.) to the final steam-injection temperature (288° C.) in 3 hours. As shown in Table 1, the cement system has a higher Young's modulus than the formation. The initial candidate cement system did not contain a chemical expansion agent.

Following the flow chart of FIG. 1, the computer simulator evaluated the stresses on the cement system arising from the steam-injection. The software predicted cement-sheath failure in tension when the temperature reached 183° C., well below the final steam-injection temperature. Therefore, according to the method, one modifies the candidate cement system such that there is chemical expansion after setting.

Figure 2:
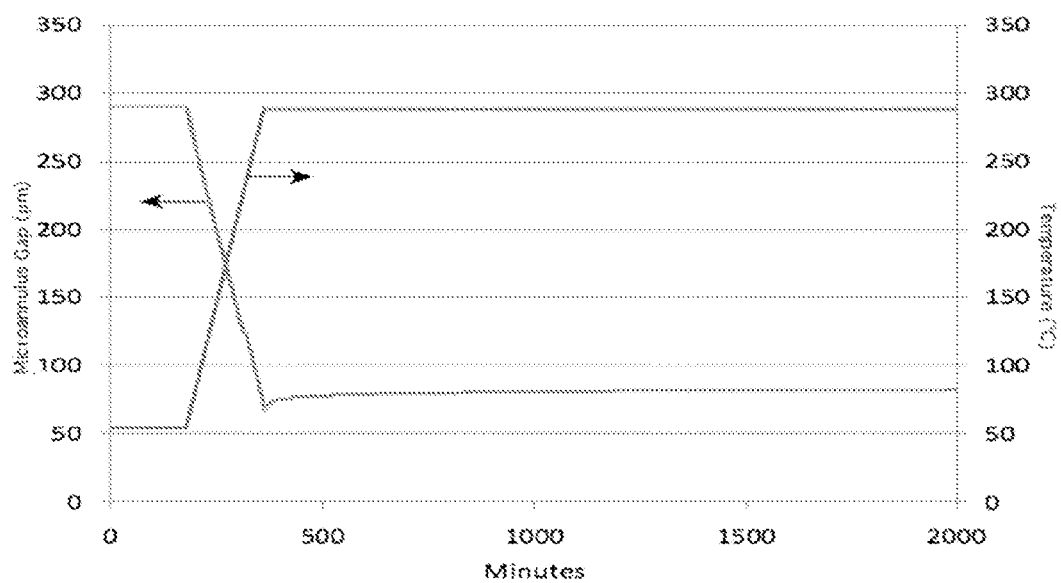
FIG. 2 shows the simulated outcome for a cement-sheath that has 0.5% chemical expansion, before and after steam injection.

The second simulation considered a cement system with the same properties, except that it contained an expanding agent. The expanding agent provided a linear expansion of 0.5% before steam injection. As shown in FIG. 2, this created a 290-μm microannulus. After steam injection, there was no cement-sheath failure; however, there was still a 70-μm microannulus between the casing and the cement sheath. This is not an acceptable solution because the presence of a microannulus during steam injection may cause steam to flow into unwanted zones and eventually reach the surface.

Figure 3:
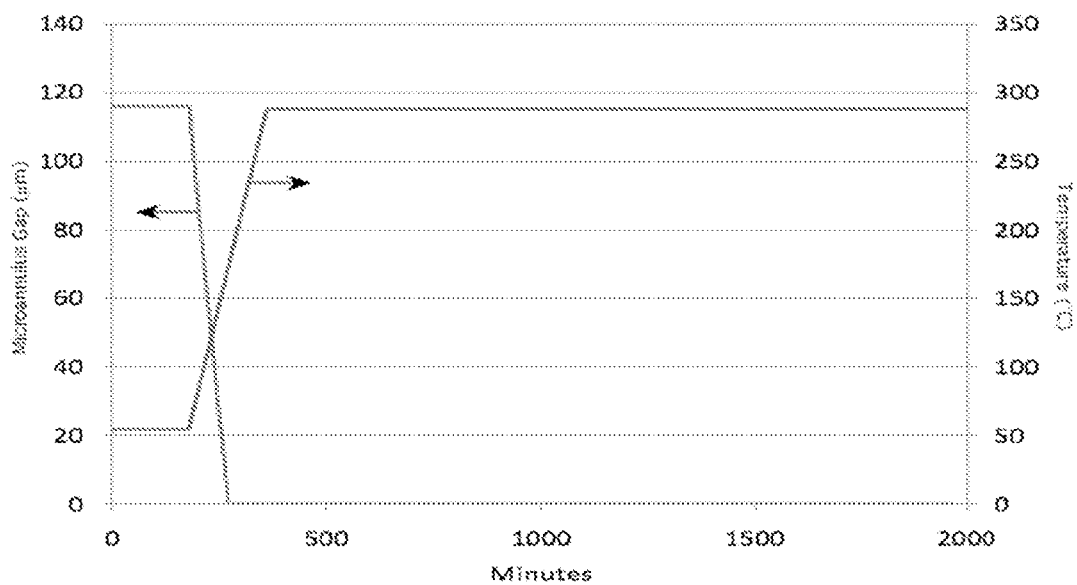
FIG. 3 shows the simulated outcome for a cement-sheath that has 0.2% chemical expansion, before and after steam injection.

Since there was no cement-sheath failure, the method directs one to reduce the amount of linear expansion. In this case, the linear expansion was lowered to 0.2%. As shown in FIG. 3, the simulation showed an initial 116-μm microannulus before steam injection. The simulation predicted no cement-sheath failure and, as shown in FIG. 3, the microannulus disappeared during steam injection. Therefore, the modified cement system with 0.2% linear expansion was chosen as the final design.

Example 2

Figure 4:
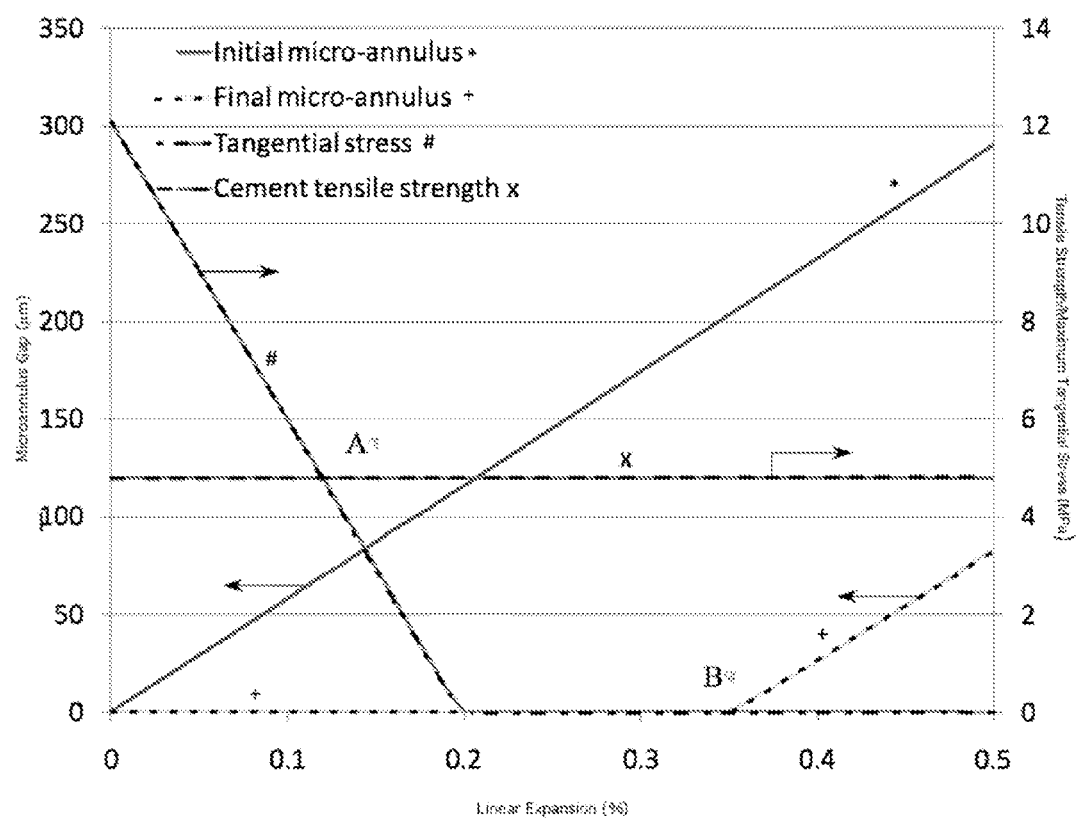
FIG. 4 shows the effects of the amount of linear expansion on the cement/casing bond and the maximum tangential stress upon steam injection.

The well conditions of Example 1 were used to evaluate the effect of different amounts of linear expansion. For each linear-expansion value, the simulator predicted the size of the initial microannulus, the size of the final microannulus during steam injection, and the maximum tangential stress generated in the cement sheath. The results are presented in FIG. 4. Several points were noted.

For linear-expansion levels less than about 0.12% (Point A on FIG. 4), the tangential stress generated in the cement sheath during steam injection is greater than the tensile strength of the cement. Points to the left of Point A are not acceptable.

For linear-expansion levels above 0.35% (Point B on FIG. 4), a microannulus exists during the steam-injection phase. Points to the right of Point B are not acceptable. An acceptable range of linear expansion is between Points A and B, or, from 0.12% to 0.35% linear expansion.

The invention claimed is:

1. A method for designing a cement system for a well having a borehole penetrating a subterranean formation, at least one casing string and at least one cement sheath, the method comprising:
   i. determining the mechanical properties of formations surrounding the well;
   ii. selecting a candidate cement system such that the cement sheath features a known amount of chemical expansion after setting, and a higher Young's modulus than the surrounding formation;
   iii. inputting data comprising well geometry and casing geometry into a computerized simulator;
   iv. running said computerized simulator to determine the cement-sheath integrity during the application of heat, pressure or both inside the well;
   v. if the simulation indicates cement-sheath failure, modifying the candidate cement system to adjust chemical expansion after setting, and repeating step iv; and
   vi. if no failure is indicated at the casing-cement interface, selecting the design as a final design.

2. The method of claim 1, wherein the cement comprises Portland cement.

3. The method of claim 1, wherein the chemical expansion of the cement system is achieved by adding to the cement one or more members of the list comprising magnesium oxide, calcium oxide, chloride salts and calcium sulfate hemihydrate.

4. The method of claim 1, wherein data from laboratory tests are used as inputs for at least one of the steps.

5. The method of claim 1, wherein data from numerical simulations are used as inputs for at least one of the steps.

6. A method for cementing a well having a borehole penetrating a subterranean formation, at least one casing string and at least one cement sheath, the method comprising:
   i. determining the mechanical properties of formations surrounding the well;
   ii. selecting a candidate cement system such that the cement sheath features a known amount of chemical expansion after setting, and a higher Young's modulus than the surrounding formation;
   iii. inputting data comprising well geometry and casing geometry into a computerized simulator;
   iv. running said computerized simulator to determine the cement-sheath integrity during the application of heat, pressure or both inside the well;
   v. if the simulation indicates cement-sheath failure, modifying the candidate cement system to adjust chemical expansion after setting, and repeating step iv;
   vi. if no failure is indicated at the casing-cement interface, selecting the design as a final design;
   vii. installing a casing string inside the subterranean borehole; and
   viii. placing a cement system according to the final design in at least one portion of the annular region between the external surface of the casing string and the borehole wall.

7. The method of claim 6, wherein the cement comprises Portland cement.

8. The method of claim 6, wherein the chemical expansion of the cement system is achieved by adding to the cement one or more members of the list comprising magnesium oxide, calcium oxide, chloride salts and calcium sulfate hemihydrate.

9. The method of claim 6, wherein data from laboratory tests are used as inputs for at least one of the steps.

10. The method of claim 6, wherein data from numerical simulations are used as inputs for at least one of the steps.

11. A method for completing a well having a borehole penetrating a subterranean formation, at least one casing string and at least one cement sheath, the method comprising:
    i. determining the mechanical properties of formations surrounding the well;
    ii. selecting a candidate cement system such that the cement sheath features a known amount of chemical expansion after setting, and a higher Young's modulus than the surrounding formation;
    iii. inputting data comprising well geometry and casing geometry into a computerized simulator;
    iv. running said computerized simulator to determine the cement-sheath integrity during the application of heat, pressure or both inside the well;
    v. if the simulation indicates cement-sheath failure, modifying the candidate cement system to adjust chemical expansion after setting, and repeating step iv;
    vi. if no failure is indicated at the casing-cement interface, selecting the design as a final design;
    vii. installing a casing string inside the subterranean borehole;
    viii. placing a cement system according to the final design in at least one portion of the annular region between the external surface of the casing string and the borehole wall;
    ix. allowing the cement system to set, harden and expand outwards, thereby creating a microannulus at the cement/casing interface prior to the application of heat, pressure or both; and
    x. perforating the casing, thereby creating at least one conduit through which fluids may flow between the casing interior and the formation.

12. The method of claim 11, wherein the cement comprises Portland cement.

13. The method of claim 11, wherein the chemical expansion of the cement system is achieved by adding to the cement one or more members of the list comprising magnesium oxide, calcium oxide, chloride salts and calcium sulfate hemihydrate.

14. The method of claim 11, wherein data from laboratory tests are used as inputs for at least one of the steps.

15. The method of claim 11, wherein data from numerical simulations are used as inputs for at least one of the steps.

16. The method of claim 11, wherein the subterranean well is a steam-injection well.

17. The method of claim 11, wherein the subterranean well is a water-injection well.

18. The method of claim 11, wherein the subterranean well is a production well.

19. The method of claim 11, further comprising performing a stimulation treatment.

20. method of claim 19, wherein the stimulation treatment comprises a matrix-acidizing treatment, a hydraulic-fracturing treatment, or both.

* * * * *